(12) United States Patent
Lee (10) Patent No.: US 12,447,222 B2
(45) Date of Patent: Oct. 21, 2025

(54) AUTOMATIC STERILIZER SYSTEM FOR A TRUNK AND CONTROL METHOD THEREFOR

(71) Applicants: Hyundai Motor Company, Seoul (KR); Kia Corporation, Seoul (KR)

(72) Inventor: Kwang-Soon Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 876 days.

(21) Appl. No.: 17/526,144

(22) Filed: Nov. 15, 2021

(65) Prior Publication Data

US 2022/0354979 A1 Nov. 10, 2022

(30) Foreign Application Priority Data

May 6, 2021 (KR) .................. 10-2021-0058511

(51) Int. Cl.
*A61L 2/24* (2006.01)
*A61L 2/10* (2006.01)
*A61L 9/20* (2006.01)

(52) U.S. Cl.
CPC ............... *A61L 2/24* (2013.01); *A61L 2/10* (2013.01); *A61L 9/20* (2013.01); *A61L 2202/11* (2013.01); *A61L 2202/14* (2013.01); *A61L 2202/15* (2013.01); *A61L 2202/23* (2013.01); *A61L 2209/111* (2013.01); *A61L 2209/12* (2013.01)

(58) Field of Classification Search
CPC ..... A61L 2/24; A61L 2/10; A61L 9/20; A61L 2202/11; A61L 2202/14; A61L 2202/15; A61L 2202/23; A61L 2209/111; A61L 2209/12; A61L 2202/16; B08B 5/02; B60H 1/248; B60H 3/0085; B60R 5/04; B60R 11/04
See application file for complete search history.

(56) References Cited

U.S. PATENT DOCUMENTS

| 5,205,781 | A  | * | 4/1993  | Kanno   | B60H 1/00428 |
|-----------|----|---|---------|---------|--------------|
|           |    |   |         |         | 62/235.1     |
| 6,707,381 | B1 | * | 3/2004  | Maloney | G07F 9/026   |
|           |    |   |         |         | 340/568.1    |
| 9,554,646 | B1 | * | 1/2017  | Charette| A47G 29/141  |
| 9,815,402 | B1 | * | 11/2017 | Salter  | G02B 6/0096  |
| 10,906,074| B1 | * | 2/2021  | Salter  | B60Q 1/0005  |

(Continued)

FOREIGN PATENT DOCUMENTS

JP 09061224 A * 3/1997 ............. G01F 23/28

*Primary Examiner* — Regina M Yoo
(74) *Attorney, Agent, or Firm* — Fox Rothschild LLP (57) ABSTRACT

An automatic sterilizer system for a trunk includes a goods sensor for sensing an existence of goods or a change amount of a location or height of goods in the trunk; an ultraviolet lamp for irradiating ultraviolet rays to an inside of the trunk; a camera sensor for photographing an image in the inside of the trunk; an air injection unit for injecting air to the inside of the trunk through an air nozzle; a trunk opening/closing sensor for sensing opening/closing of the trunk; and a control unit for sensing the existence or location and height change amounts of goods loaded in the trunk from the goods sensor, and actuating the ultraviolet lamp and the air injection unit according to the sensed existence and change amounts of goods to sterilize the inside of the trunk.

8 Claims, 6 Drawing Sheets

(56) References Cited

U.S. PATENT DOCUMENTS

| | | | |
|---|---|---|---|
| 11,684,685 B1* | 6/2023 | Gonzalez | A61L 2/10 |
| | | | 250/455.11 |
| 2016/0052490 A1* | 2/2016 | Hardy | B60R 25/10 |
| | | | 340/426.1 |
| 2018/0209613 A1* | 7/2018 | Callahan | B64D 11/02 |
| 2019/0076558 A1* | 3/2019 | Zhang-Miske | B60N 2/0029 |
| 2019/0176986 A1* | 6/2019 | Addonisio | B64U 70/90 |
| 2020/0204203 A1* | 6/2020 | de Perthuis | G07C 9/00309 |
| 2021/0112647 A1* | 4/2021 | Coleman | H05B 47/16 |
| 2021/0308300 A1* | 10/2021 | Rathi | B60S 1/66 |
| 2021/0322594 A1* | 10/2021 | Ahmad | A61L 2/10 |
| 2022/0008596 A1* | 1/2022 | Sood | A61L 9/20 |
| 2022/0008602 A1* | 1/2022 | Sood | A61L 9/20 |
| 2022/0031876 A1* | 2/2022 | Ubale | A61L 2/24 |
| 2022/0054675 A1* | 2/2022 | Duncan | A61L 2/24 |
| 2022/0305154 A1* | 9/2022 | Hrecznyj | B60L 53/12 |
| 2022/0378957 A1* | 12/2022 | Hanney | B60R 7/04 |
| 2023/0075734 A1* | 3/2023 | Simms | G07C 9/00309 |

\* cited by examiner

AUTOMATIC STERILIZER SYSTEM FOR A TRUNK AND CONTROL METHOD THEREFOR

CROSS-REFERENCE TO RELATED APPLICATION(S)

This application claims under 35 U.S.C. § 119 the benefit of Korean Patent Application No. 10-2021-0058511, filed on May 6, 2021 in the Korean Intellectual Property Office, the entire contents of which are incorporated by reference herein.

BACKGROUND

1. Technical Field

The present disclosure relates to an automatic sterilizer system for a trunk and a control method therefor, more particularly, to the automatic sterilizer system configured to include a goods sensor for sensing an existence of goods or a change amount of a location or height of goods in the trunk; an ultraviolet lamp for irradiating ultraviolet rays to an inside of the trunk; a camera sensor for photographing an image of the inside of the trunk; an air injection unit for injecting air to the inside of the trunk through an air nozzle; a ventilator opening/closing module for opening/closing a rear camera module installed in a ventilator formed in the trunk and ventilating the inside of the trunk through the ventilator; a navigation module; a telematics module for receiving information on a vehicle destination or information on consumption of a user of the vehicle by performing communication with an external server of the vehicle; a trunk opening/closing sensor for sensing opening/closing of the trunk; and a control unit for sensing the existence or location and height change amounts of goods loaded in the trunk from the goods sensor, and actuating the ultraviolet lamp and the air injection unit according to the sensed existence and change amounts of goods to sterilize the inside of the trunk.

2. Description of the Related Art

In general, a user of a vehicle stores, in a trunk space of an automobile, various goods such as goods required for traveling or goods purchased by shopping.

However, the trunk can be polluted as the bacteria or virus is propagated from goods stored in the trunk to an internal space of the trunk, and as a result, there is a concern about adversely affecting the user.

A contamination source such as dust or fungus may be generated in the trunk, and odors generated from goods (such as a fish odor, etc.), may occur.

Therefore, there is a need to develop a new sterilization system that can remove bacteria, viruses, dust, fungi, and odor that can be generated in the trunk during vehicle use.

SUMMARY

The present disclosure provides an automatic sterilizer system for a vehicle and a control method therefor, which can remove bacteria, viruses, dust, fungi, and odor which may be generated from a trunk during vehicle use.

The present disclosure relates to an automatic sterilizer system for a trunk, and a control method therefor, where the automatic sterilizer system is configured to include: a goods sensor for sensing an existence of goods or a change amount of a location or height of goods in the trunk; an ultraviolet lamp for irradiating ultraviolet rays to an inside of the trunk; a camera sensor for photographing an image of the inside of the trunk; an air injection unit for injecting air to the inside of the trunk through an air nozzle; a ventilator opening/closing module for opening/closing a rear camera module installed in a ventilator formed in the trunk and ventilating air in the inside of the trunk through the ventilator; a navigation module; a telematics module for receiving information on a vehicle destination or information on consumption of a user of the vehicle by performing communication with an external server of the vehicle; a trunk opening/closing sensor for sensing opening/closing of the trunk; and a control unit for sensing the existence or the change amounts of the location and height change of the goods loaded in the trunk from the goods sensor, and actuating the ultraviolet lamp and the air injection unit according to the sensed existence and change amounts of goods to sterilize the inside of the trunk.

According to an exemplary embodiment of the present disclosure, the automatic sterilizer system for a trunk having such a configuration, and a control method therefor can automatically sterilize and annihilate bacteria or viruses which may be propagated from goods stored in the trunk to eliminate a concern that bacteria or viruses will adversely affect a user through the trunk, thereby providing a hygienic and secure vehicle traveling environment.

Dust, fungi, or odor can be reduced through sterilization of the trunk to clearly and freshly maintain the trunk, thereby enhancing merchantability of a vehicle.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, configurations and actuations of an automatic sterilizer system for a trunk and a control method therefor according to the present disclosure will be described in detail with reference to drawings.

However, disclosed drawings are provided as an example for allowing those skilled in the art to sufficiently appreciate the spirit of the present disclosure. Accordingly, the present disclosure is not limited to drawings presented below, but may be embodied in other aspects.

Unless otherwise defined, the terms used in the description of the present disclosure have the same meaning as commonly understood by those skilled in the art to which the present disclosure belongs and in the following description and the accompanying drawings, a detailed description of known functions and configurations that may unnecessarily blur the gist of the present disclosure is omitted.

Figure 1:
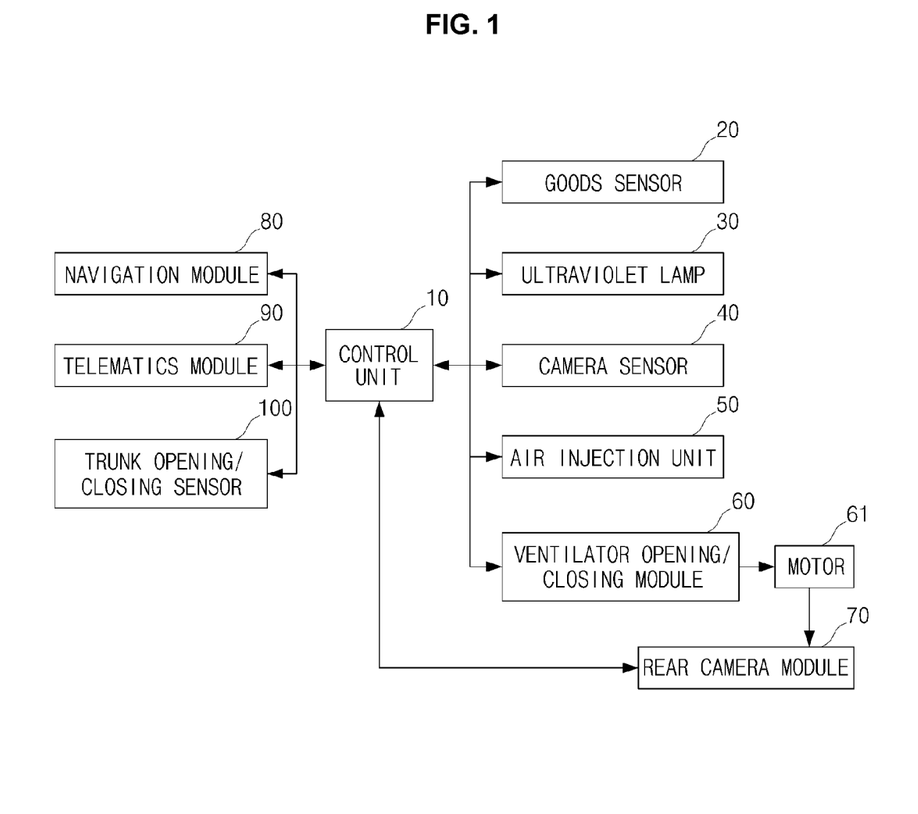
FIG. 1 is a block diagram of an automatic sterilizer system for a trunk according to the present disclosure.

FIG. 1 is a block diagram of an automatic sterilizer system for a trunk according to the present disclosure.

Referring to FIG. 1, the automatic sterilizer system for a trunk according to the present disclosure is configured to include: a goods sensor 20 sensing existence of goods in the trunk or a change amount of a location or height of the goods; an ultraviolet lamp 30 irradiating ultraviolet rays to the inside of the trunk; a camera sensor 40 photographing an image in the inside of the trunk; an air injection unit 50 injecting air to the inside of the trunk through an air nozzle 51; a ventilator opening/closing module 60 opening/closing a rear camera module 70 installed in a ventilator formed in the trunk and ventilating air in the inside of the trunk through the ventilator; a navigation module 80; a telematics module 90 receiving information on a vehicle destination or information on consumption of a user of the vehicle by performing communication with an external server of the vehicle; a trunk opening/closing sensor 100 sensing opening/closing of the trunk; and a control unit 10 sensing the existence or location and height change amounts of goods loaded in the trunk from the goods sensor 20, and actuating the ultraviolet lamp 30 and the air injection unit 50 according to the sensed existence and change amounts of goods to sterilize the inside of the trunk.

Figure 2:
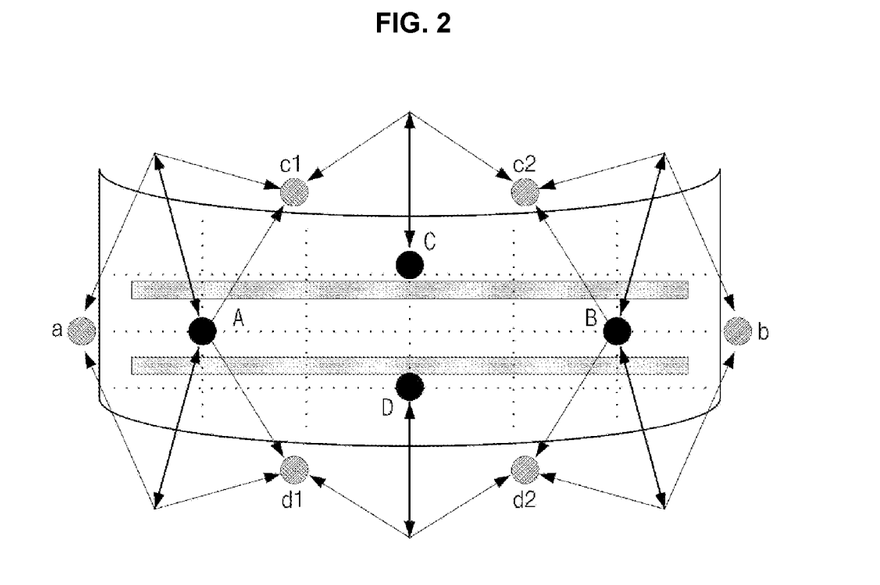
FIG. 2 is a configuration diagram illustrating an example of an installation state of a goods sensor of the automatic sterilizer system for a trunk according to the present disclosure.
Figure 3:
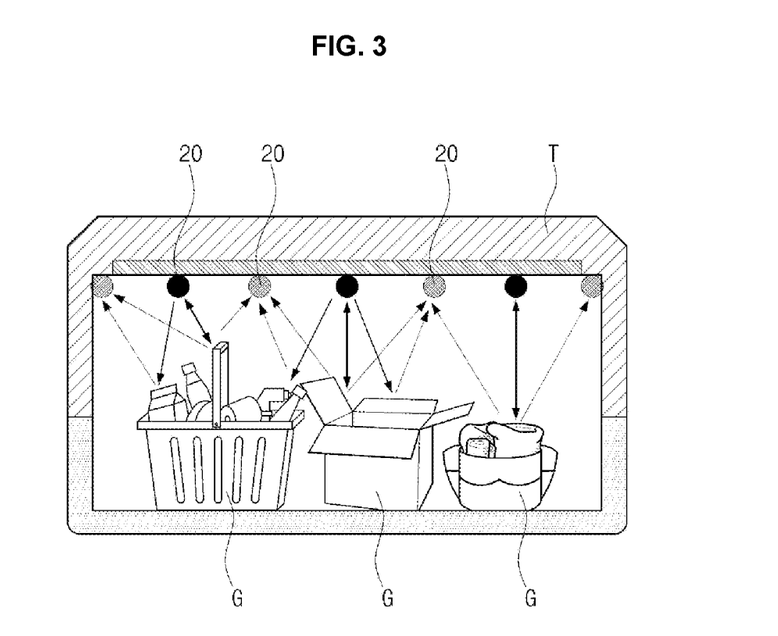
FIG. 3 is an operation state diagram of the goods sensor illustrated in FIG. 2.

FIG. 2 is a configuration diagram illustrating an example of an installation state of the goods sensor of the automatic sterilizer for a trunk according to the present disclosure and FIG. 3 is an operation state diagram of the goods sensor illustrated in FIG. 2.

Referring to FIG. 2, the goods sensor 20 installed on a inner surface of the trunk T of the vehicle is illustrated, and as illustrated in the figure, multiple goods sensors 20 are attached to a inner surface an upper trim of the trunk T and a lateral surface of the upper trim of the trunk T.

Preferably, the goods sensor 20 according to an exemplary embodiment of the present disclosure uses an ultrasonic sensor and hereinafter, the goods sensor 20 will be described as the ultrasonic sensor.

However, according to a size of a space, an installation location, and sensing performance of the trunk T in the vehicle, a radar communication device or an ultra wideband (UWB) communication device may be used as the goods sensor 20.

The goods sensor 20 which senses the existence of goods or the change amount of the location or the height of goods in the inside of the trunk is constituted by multiple, i.e., at least two ultrasonic sensors, and the illustrated exemplary embodiment is constituted by 10 ultrasonic sensors A, a, B, b, C, c1, c2, D, d1, and d2.

The ultrasonic sensors directly or indirectly receive an ultrasonic wave signal to sense the inside of the trunk, and when the illustrated exemplary embodiment is described as an example, an ultrasonic wave signal transmitted by ultrasonic sensor A is received by ultrasonic sensors A, a, c1, and d1, an ultrasonic wave signal transmitted by ultrasonic sensor B is received by ultrasonic sensors B, b, c2, and d2, an ultrasonic wave signal transmitted by ultrasonic sensor C is received by ultrasonic sensors C, D, c1, and c2, and an ultrasonic wave signal transmitted by ultrasonic sensor D is received by ultrasonic sensors C, D, d1, and d2.

A total time required for transmission/reception of the ultrasonic wave signal among 10 ultrasonic sensors as described above is measured approximately between 36 ms and 50 ms in the case of an exemplary embodiment of the present disclosure.

In this case, as illustrated in FIG. 3, the goods sensor 20 according to the present disclosure uses the ultrasonic sensor to sense a location and a height of an object G in the trunk, sense whether the object is changed in an allocation region of each ultrasonic sensor, and adjust an air blow amount for odor removal and ventilation based thereon, and for example, when an object having a large volume exists in an adjacent region of the air injection unit 50 performing air blow, a discharge air amount may be reduced, and when the object does not exist in the adjacent region of the air injection unit 50, the discharge air amount may increase in order to further blow the air up to a corner in the trunk.

The control unit 10 searches a destination of the vehicle generated by the navigation module 80 to determine whether the destination of the vehicle is a business for purchasing goods to be stored in the trunk and then as a result of the determination, when the destination of the vehicle is determined as a business for purchasing goods to be stored in the trunk, it is determined whether there is goods which may be smelled among goods purchased by receiving details of a card payment used by the corresponding business from the telematics module 90.

For example, goods which may be smelled may include goods of which odor is relatively strong, such as aquatic goods, kimchi, etc.

In this case, as the purchased goods, a sportswear used as general industrial goods or wet goods may be subjected to the sterilization by actuating the air injection unit 50 and the ultraviolet lamp 30, and goods which need to be sterilized after use, such as a coat or a mask may be subjected to the sterilization by actuating the air injection unit 50 and the ultraviolet lamp 30.

Fresh foods such as fruits or vegetables which are not smelled are subjected to the ultraviolet lamp using only the ultraviolet lamp 30 to effectively perform sterilization for the surface of the fruits or vegetables.

In order to remove odors of foods which is smelled, such as fish or cooked foods, the ventilator opening/closing module 60 to be described below is actuated to ventilate the air in the trunk to the outside.

Figure 4A:
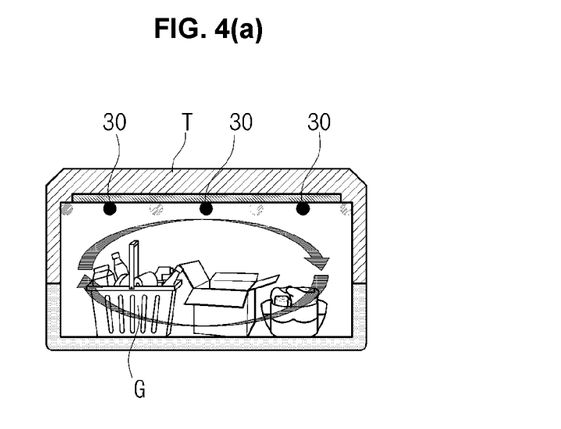
FIGS. 4(a) and 4(b) are configuration diagrams illustrating an example of an installation state of an ultraviolet lamp, an air injection unit, and an image photographing unit of the automatic sterilizer system for a trunk according to the present disclosure.
Figure 4B:
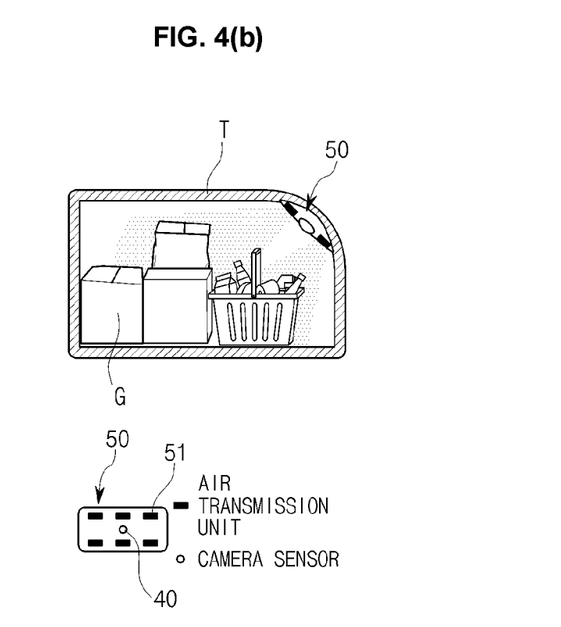

FIG. 4 is a configuration diagram illustrating an example of an installation state of an ultraviolet lamp, an air injection unit, and an image photographing unit of the automatic sterilizer for a trunk according to the present disclosure.

First, referring to (a) at a left side of FIG. 4, in an exemplary embodiment of the present disclosure, for ultraviolet lamp of the internal space of the trunk, at least two ultraviolet lamps 30 are installed on the back surface of the upper trim of the trunk T of the vehicle.

First, referring to (b) at a right side of FIG. 4, in an exemplary embodiment of the present disclosure, in order to perform ultraviolet lamp, odor removal, and ventilation in the trunk, the air injection unit 50 is installed on the back surface of the upper trim of trunk T of the vehicle.

An air nozzle 51 is mounted on the air injection unit 50 through which the air is discharged, and furthermore, the camera sensor 40 is mounted on a body center part of the air injection unit 50.

The camera sensor 40 generates image data acquired by photographing the inside of the trunk to allow the control unit 10 to secondarily use the image data for determining the existence, and the change amounts of the location and the height of the object G by the goods sensor 20.

Since the automatic sterilizer system for a trunk according to the present disclosure includes the ultraviolet lamp 30, the camera sensor 40, and the air injection unit 50, the ultraviolet lamp 30 and the air injection unit 50 may be simultaneously actuated, and while bacteria fixed to the object G are brought up by air discharge by the air injection unit 50 through the simultaneous actuation, the sterilization by the ultraviolet lamp 30 may be made, thereby maximizing a sterilization effect in the trunk.

In the automatic sterilizer system for a trunk according to an exemplary embodiment of the present disclosure, while the air is discharged by the air injection unit 50 while the trunk T is closed, sterilization is primarily performed, and the goods sensor 20 and the camera sensor 40 check whether the object in the trunk is changed and then, the inside of the trunk may be secondarily sterilized by actuating the ultraviolet lamp 30, and when the air injection unit 50 is simultaneously actuated during secondary sterilization, the sterilization effect may be increased as described above.

Each of the actuation times of the ultraviolet lamp 30 and the air injection unit 50 according to an exemplary embodiment of the present disclosure is set to 60 seconds per actuation.

Meanwhile, the trunk opening/closing sensor 100 is a sensor generally installed in the vehicle, and the control unit 10 determines start timings of actuation of the ultraviolet lamp 30 and the air injection unit 50 by referring to a sensor signal regarding whether the trunk is opened or closed, which is received from the trunk opening/closing sensor 100.

Figure 5:
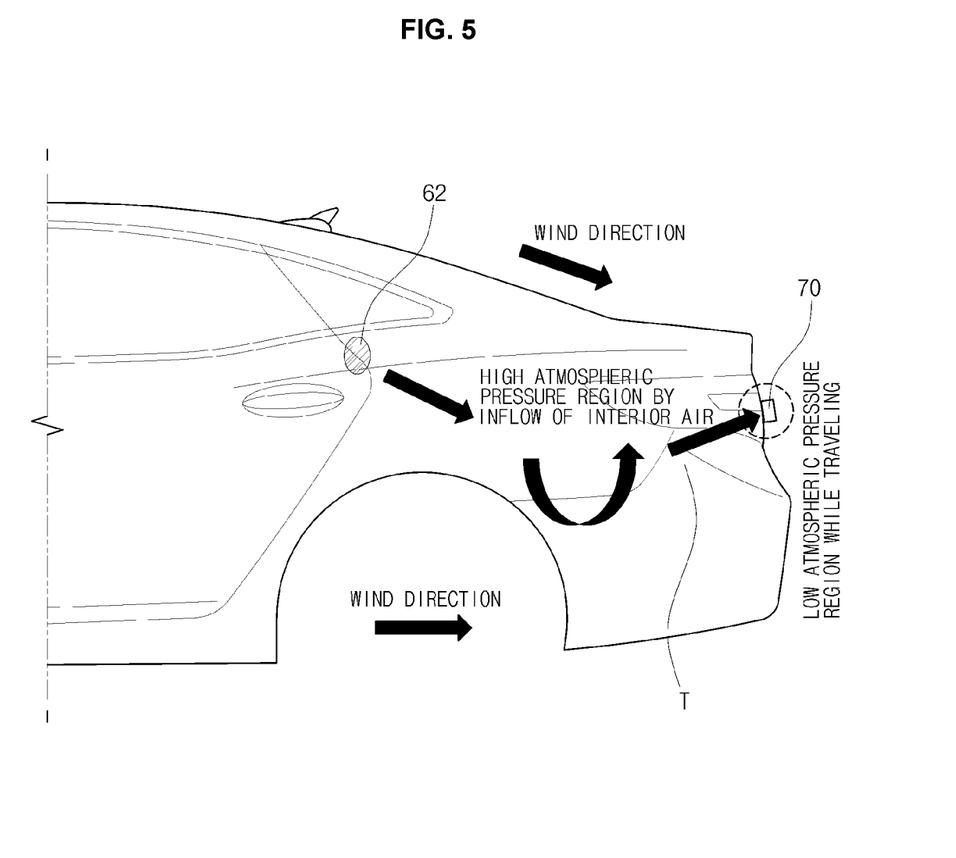
FIG. 5 is a diagram illustrating an air flow of a trunk interior of the automatic sterilizer system for a trunk according to the present disclosure.

FIG. 5 is a diagram illustrating an air flow of a trunk interior of the automatic sterilizer for a trunk according to the present disclosure.

Referring to the figure, in an exemplary embodiment of the present disclosure, a ventilator opening/closing module 60 is installed on an upper trim or a lower trim of a trunk T for ventilation of internal air of the trunk.

The ventilator opening/closing module 60 includes a motor 61, and opens/closes a ventilator 62 formed on the back surface of the upper trim or the trunk T or a lateral surface thereof by driving a motor 61, and in an exemplary embodiment of the present disclosure, the ventilator 62 opened/closed by the ventilator opening/closing module 60 is opened/closed by the rear camera module 70 installed on the upper trim or the lower trim of the trunk T of the vehicle.

According to an exemplary embodiment of the present disclosure, an air vent 110 through which the air may flow to the trunk is installed on a rear seat of the vehicle or in the vicinity thereof so that air in an interior space of the vehicle may flow into the trunk of the vehicle.

Accordingly, as illustrated, since the flow of the wind acts on a rear side from a traveling direction of the vehicle when the vehicle travels, the flow of the air proceeds to the rear side from the front side of the vehicle, and as a result, the interior space of the vehicle becomes a high atmospheric pressure state while the air moves to the internal space of the trunk T from the interior space of the vehicle through the air vent 110.

Then, when the ventilator opening/closing module 60 opens the ventilator 62 by performing an actuation such as rotating the rear camera module 70 at an angle of 90° by driving the motor 61 for ventilation in the trunk, the inside of the trunk is ventilated while the air which exists in the interior space of the vehicle in the high atmospheric pressure state is discharged to the outside of the trunk through the ventilator 62 while forming a flow in which the air moves in a trunk outside direction in a relatively low atmospheric pressure state due to opening of the ventilator 62.

Next, a control method of the automatic sterilizer system for a trunk according to the present disclosure configured as such will be described with reference to a flowchart of the control method of the present disclosure in FIGS. 6 and 7.

The control method of the automatic sterilizer system for a trunk according to the present disclosure is a control method performed by the automatic sterilizer system for a trunk configured to include the control unit 10, the goods sensor 20, the ultraviolet lamp 30, the camera sensor 40, the air injection unit 50 injecting the air into the trunk through the air nozzle 51, the ventilator opening/closing module 60, the rear camera module 70, the navigation module 80, the telematics module 90, and the trunk opening/closing sensor 100.

Figure 6:
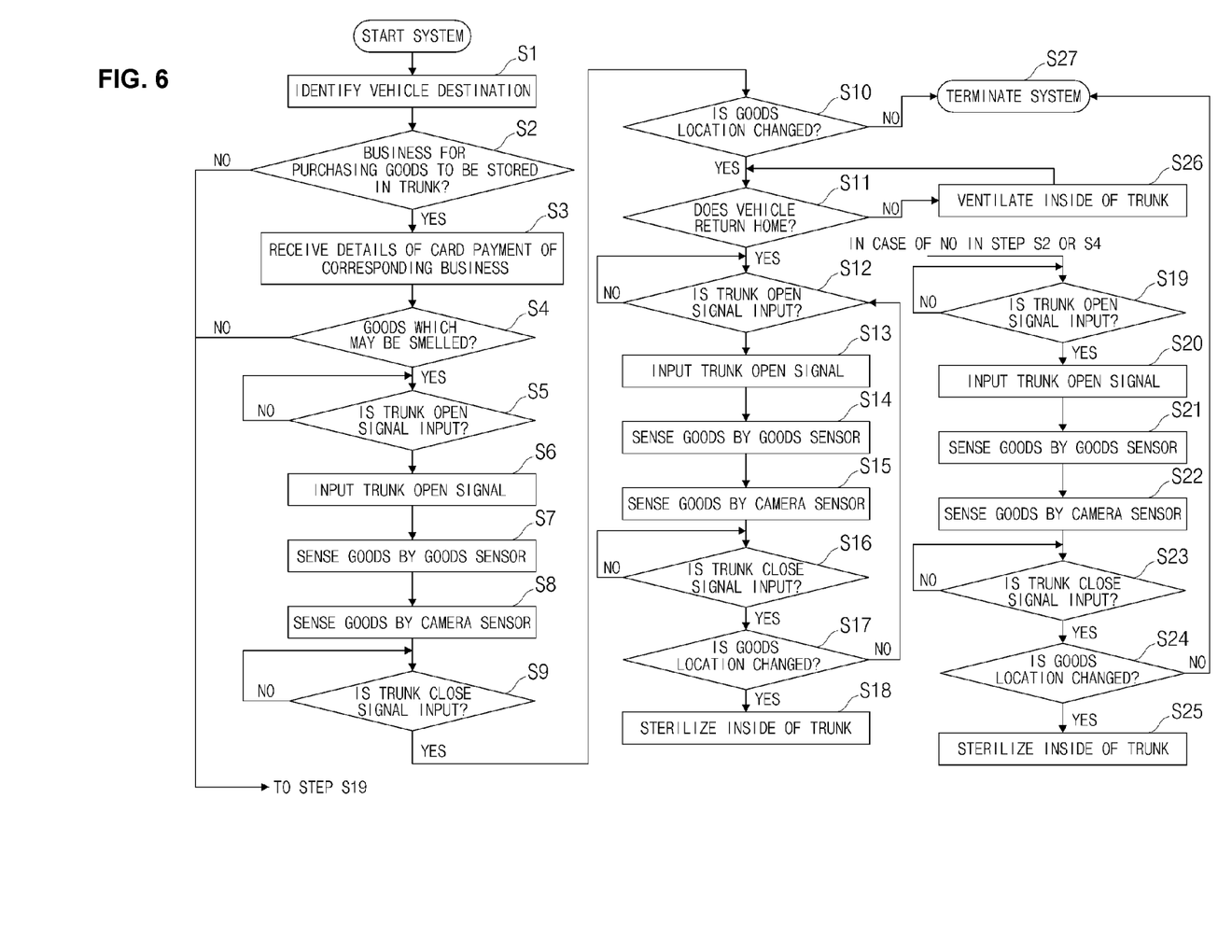
FIGS. 6 and 7 are flowcharts of a control method of an automatic sterilizer system for a trunk according to the present disclosure.

First, referring to FIG. 6, the control unit 10 activates an actuation of a trunk sterilizer system according to the present disclosure (S0).

The control unit 10 receives traveling information of a vehicle from the navigation module 80 to recognize a destination of the corresponding vehicle (S1). Next, the control unit 10 determines whether there is a business for purchasing goods to be stored in the trunk, such as a mart, a depai linent store, a market, a supermarket, a discount store, a shopping mall, a restaurant, a café, a butcher, etc. among the recognized destinations (S2).

In step S2 above, when it is determined that there is the corresponding business, the control unit 10 receives details of the card payment used in the corresponding business from the telematics module 90 (S3).

Then, the control unit 10 determines the details of the card payment and determines whether there are goods which may be smelled among the purchased goods (S4).

Goods which may be smelled may include goods of which odor is relatively strong, such as aquatic goods, kimchi, etc., and an exemplary embodiment of the present disclosure may provide a differentiated function according to the purchased goods.

For example, a sportswear used as general industrial goods or wet goods may be subjected to the sterilization by actuating the air injection unit 50 and the ultraviolet lamp 30, and goods which need to be sterilized after use, such as a coat or a mask may be subjected to the sterilization by actuating the air injection unit 50 and the ultraviolet lamp 30.

Fresh foods such as fruits or vegetables which are not smelled are subjected to the ultraviolet lamp using only the ultraviolet lamp 30 to effectively perform sterilization for the surface of the fruits or vegetables.

Further, in order to remove odors of foods which is smelled, such as fish or cooked foods, the ventilator opening/closing module 60 is actuated to ventilate the air in the trunk to the outside as described above.

When it is determined that there is goods which may be smelled in step S4 above, the control unit 10 determines whether a signal of open of the trunk T is input from the trunk opening/closing sensor 100 of the vehicle (S5).

If the trunk open signal is input in step S5 above (S6), the control unit 10 regards that the user opens the trunk in order to store the article purchased in the corresponding business in the trunk and senses the existence of goods and the location or the height of goods in the trunk by using the goods sensor 20 installed in the trunk (S7), and subsequently, recognizes the existence of goods and the location or the height of goods by identifying the image in the trunk by using the camera sensor 40 (S8).

In an exemplary embodiment of the present disclosure, when the ultrasonic sensor is used as the goods sensor 20, the existence of goods and the location or the height of goods are determined by actuating the ultrasonic sensor at approximately 1 second.

For convenience of description, in the following description, information on the existence of goods and the location or the height of goods in the trunk, which are sensed in steps S7 and S8 above will be referred to as 'initial odor goods information'.

Next, the control unit 10 determines whether a signal of a close of the trunk T is input from the trunk opening/closing sensor 100 of the vehicle (S9).

When the close signal of the trunk is input in step S9 above, the control unit 10 determines whether the existence of goods in the trunk is changed and the location or the height of goods is changed by comparing with the initial odor goods information by using the goods sensor 20 installed in the trunk (S10).

When it is determined that the existence of goods in the trunk is changed and the location or the height of goods is changed in step S10 above, the control unit 10 receives the traveling information of the vehicle from the navigation module 80 to determine whether the corresponding vehicle returns home (S11).

In an exemplary embodiment of the present disclosure, when the ultrasonic sensor is used as the goods sensor 20, if the change amount of the location or the height of goods is 3 cm or more, it is determined that the location or the height is changed.

According to a determination result in step S11 above, if the corresponding vehicle returns home, the control unit 10 determines whether the signal of the open of the trunk T is input from the trunk opening/closing sensor 100 of the vehicle (S12).

If the trunk open signal is input in step S12 above (S13), the control unit 10 regards that the user opens the trunk in order to take out the article purchased in the corresponding business from the trunk and senses the existence of goods and the location or the height of goods in the trunk by using the goods sensor 20 installed in the trunk (S14), and subsequently, recognizes the existence of goods and the location or the height of goods by identifying the image in the trunk by using the camera sensor 40 (S15).

For convenience of description, in the following description, information on the existence of goods and the location or the height of goods in the trunk, which are sensed in steps S14 and S15 above will be referred to as 'mid-term odor goods information'.

Next, the control unit 10 determines whether a signal of a close of the trunk T is input from the trunk opening/closing sensor 100 of the vehicle (S16).

When the close signal of the trunk is input in step S16 above, the control unit 10 determines whether the existence of goods in the trunk is changed and the location or the height of goods is changed by comparing with the mid-term odor goods information by using the goods sensor 20 installed in the trunk (S17). This is to perform ultraviolet lamp of the trunk after removing goods by determining whether all odor goods in the trunk are removed.

When it is determined that the existence of goods in the trunk is changed and the location or the height of goods is changed by comparing with the mid-term odor goods information in step S17 above, the control unit 10 sterilizes the inside of the trunk by actuating the air injection unit 50 and the ultraviolet lamp 30 (S18). By such an ultraviolet lamp action, it is possible to remove bacteria such as the fungi, etc., in the trunk and remove the remaining odor.

In this case, if the corresponding vehicle does not return home as a result of determining whether the corresponding vehicle returns home by receiving the traveling information of the vehicle in step S11 above, it is regarded that a current vehicle is in middle of returning home and the control unit 10 opens the ventilator 62 formed on the back surface of the upper trim of the trunk T or the lateral surface thereof by driving the ventilator opening/closing module 60 on the upper trim or the lower trim of the trunk T to discharge the air to the outside of the trunk, thereby ventilating the inside of the trunk (S26). In an exemplary embodiment of the present disclosure, the configuration for internal ventilation of the trunk is described in detail with reference to FIG. 5 described above, so a detailed description is omitted.

Meanwhile, if there is no business such as the mart, the department store, the market, the supermarket, the discount store, the shopping mall, the restaurant, the café, the butcher, etc. among the recognized destinations in step S2 above or there is no goods which may be smelled among the purchased goods in the details of the card payment in step S4, the control unit 10 determines whether the signal of the open of the trunk T is input from the trunk opening/closing sensor 100 of the vehicle (S19).

If the trunk open signal is input in step S19 above (S20), the control unit 10 regards that the user opens the trunk in order to take out general goods which are not smelled, which is purchased in the corresponding business from the trunk and senses the existence of goods and the location or the height of goods in the trunk by using the goods sensor 20 installed in the trunk (S21), and subsequently, recognizes the existence of goods and the location or the height of goods by identifying the image in the trunk by using the camera sensor 40 (S22).

For convenience of description, in the following description, information on the existence of goods and the location or the height of goods in the trunk, which are sensed in steps S21 and S22 above will be referred to as 'initial general goods information'.

Next, the control unit 10 determines whether a signal of a close of the trunk T is input from the trunk opening/closing sensor 100 of the vehicle (S23). When the close signal of the trunk is input in step S23 above, the control unit 10 determines whether the existence of goods in the trunk is changed and the location or the height of goods is changed by comparing with the initial general goods information by using the goods sensor 20 installed in the trunk (S24).

When it is determined that the existence of goods in the trunk is changed and the location or the height of goods is changed by comparing with the initial general goods information in step S24 above, the control unit 10 sterilizes the inside of the trunk by actuating the air injection unit 50 and the ultraviolet lamp 30 (S25).

Meanwhile, if the existence of goods in the trunk is not changed and the location or the height of goods is not changed by comparing with the initial odor goods information in step S10 above or the existence of goods in the trunk is not changed and the location or the height of goods is not changed by comparing the initial general goods information in step S24 above, the control unit 10 terminates the actuation of the sterilizer system for a trunk according to the present disclosure (S27).

Next, referring to the flowchart of FIG. 7, a process in which the control unit 10 in steps S18 and S25 actuates the air injection unit 50 and the ultraviolet lamp 30 to sterilize the inside of the trunk will be described in more detail.

Figure 7:
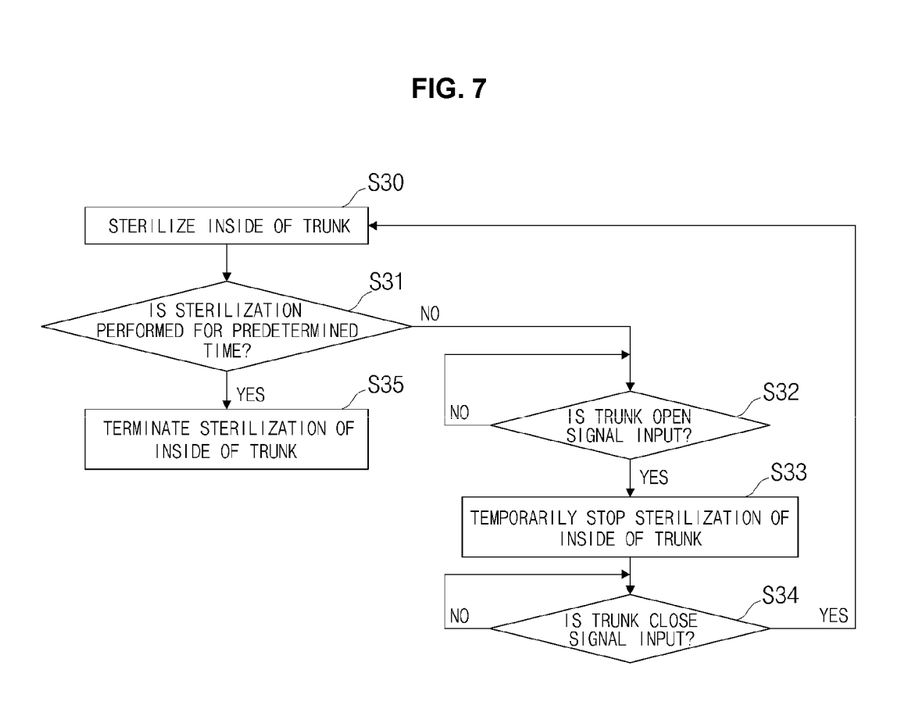

Referring to FIG. 7, in the process of sterilizing the inside of the trunk in steps S18 and S25 described above, the control unit 10 sterilizes the inside of the trunk by actuating the air injection unit 50 and the ultraviolet lamp 30 (S30) and the control unit 10 determines whether sterilization is performed for a predetermined time (S31). In an exemplary embodiment of the present disclosure, each of actuation times of the ultraviolet lamp 30 and the air injection unit 50 is set to 60 seconds per actuation.

If the ultraviolet lamp is performed for a predetermined time in step S31 above, the control unit 10 terminates the actuation of the trunk sterilizer system of the present disclosure (S35).

However, if the sterilization is not yet completed for a predetermined time in step S31 above, the control unit 10 determines whether the open signal of the trunk is input form the trunk opening/closing sensor 100 (S32) and since the trunk is opened During ultraviolet sterilization if the open signal of the trunk is input according to the determination result, the control unit 10 temporarily stops the actuation of the trunk sterilizer system of the present disclosure (S33), the control unit 10 determines whether the close signal of the trunk is input from the trunk opening/closing sensor (S34), and if the trunk is closed, the control unit 10 sterilizes the inside of the trunk again by actuating the air injection unit 50 and the ultraviolet lamp 30 (S30).

What is claimed is:

1. An automatic sterilizer system for a trunk of a vehicle, the automatic sterilizer system comprising:
   a goods sensor for sensing an existence of goods in the trunk;
   an ultraviolet lamp for irradiating ultraviolet rays to an inside of the trunk;
   a control unit for sensing the existence of goods loaded in the trunk from the goods sensor, and actuating the ultraviolet lamp according to the sensed existence of the goods, in order to sterilize the inside of the trunk; and
   an air injection unit for injecting air to the inside of the trunk through an air nozzle,
   wherein the control unit separately actuates the ultraviolet lamp and the air injection unit or simultaneously actuates the ultraviolet lamp and the air injection unit for sterilization of the trunk.

2. The automatic sterilizer system of claim 1, wherein the goods sensor is an ultrasonic sensor, a radar communication device, or an ultra wideband (UWB) communication device.

3. The automatic sterilizer system of claim 1, wherein the control unit reduces or increases a discharge air amount of the air injection unit according to the existence of the goods sensed by the goods sensor.

4. The automatic sterilizer system of claim 1, further comprising:
   a camera sensor for generating image data acquired by photographing an image of the inside of the trunk,
   wherein the control unit is configured to allow the camera sensor to use the image data acquired by photographing the inside of the trunk in order to determine the existence of the goods by the goods sensor.

5. The automatic sterilizer system of claim 1, further comprising:
   a ventilator opening/closing module installed on an upper trim or a lower trim of the trunk for ventilation of internal air of the trunk,
   wherein the ventilator opening/closing module is configured to open/close a ventilator installed in the trunk by driving a motor.

6. The automatic sterilizer system of claim 5, wherein an air vent is installed so that air in an interior space of the vehicle flows into the trunk of the vehicle, and
   if the air moves to an internal space of the trunk from the interior space of the vehicle through the air vent when the vehicle travels, the control unit opens the ventilator by driving the motor of the ventilator opening/closing module to ventilate the inside of the trunk.

7. The automatic sterilizer system of claim 1, further comprising:
   a navigation module for generating information on a destination of a vehicle; and
   a telematics module for receiving information on consumption of a user of the vehicle by performing communication with an external server,
   wherein the control unit searches a destination of the vehicle generated by the navigation module to determine whether the destination of the vehicle is a business for purchasing the goods to be stored in the trunk and then as a result of the determination, when the destination of the vehicle is determined as a business for purchasing the goods to be stored in the trunk, the control unit determines whether there is goods which may be smelled among goods purchased by receiving details of a card payment used by the corresponding business from the telematics module to sterilize the trunk by actuating the ultraviolet lamp and the air injection unit.

8. The automatic sterilizer system of claim 1, further comprising:
   a trunk opening/closing sensor for sensing whether the trunk is opened/closed,
   wherein the control unit refers to whether the trunk is opened/closed in order to determine a start timing of the actuation of the ultraviolet lamp.

* * * * *